Patented Apr. 4, 1950

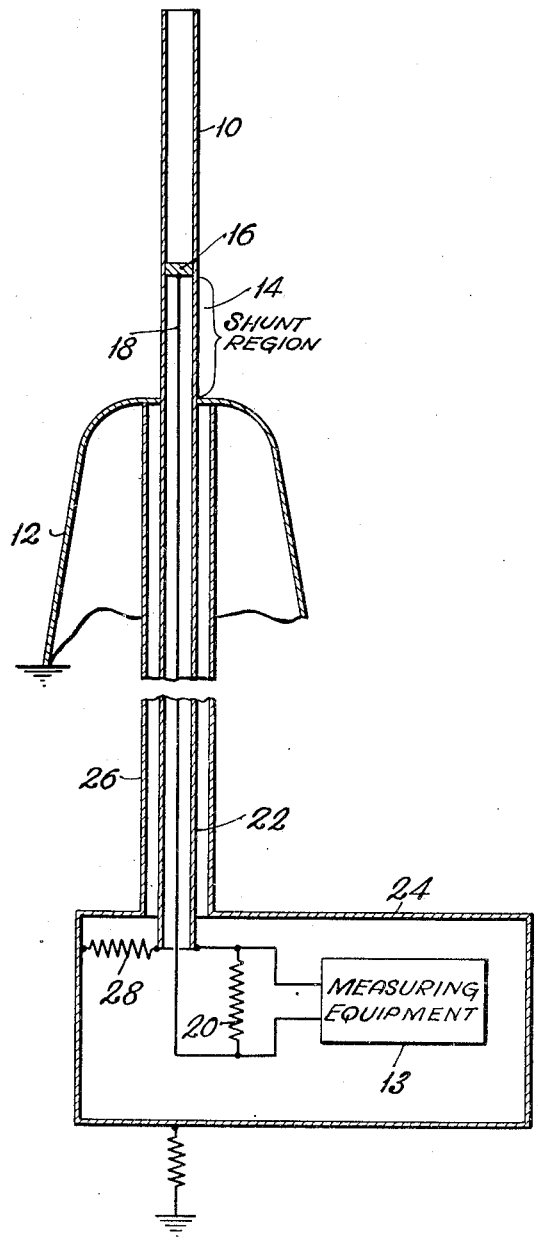

2,502,657

UNITED STATES PATENT OFFICE

2,502,657

CURRENT MEASURING SHUNT IN LIGHTNING RODS

Nils E. Lindenblad, Rocky Point, N. Y., assignor to Radio Corporation of America, a corporation of Delaware Application December 29, 1944, Serial No. 570,348

10 Claims. (Cl. 171—95)

The present invention relates to an improved form of lightning rod construction and, more particularly, to a form of construction whereby the peak currents developed in the ground conductor for the lightning rod may be measured.

Due to the steep wave front of the current wave developed when a lighting discharge strikes a lightning rod, it is important that the system for measuring the current flow in the grounding conductor discriminate between inductive voltage drop and the pure resistance drop in said conductor.

An object, therefore, of the present invention is to provide a current measuring system which is entirely unresponsive to the inductive voltage drop in the ground conductor.

A further object of the present invention is to provide a means for investigating the lightning discharge currents in a lighting rod located on the top of a high building, said rod being so constructed as to not contain fragile insulators which if broken would allow fragments to fall to the street below to the danger of persons on the street.

A further object of the present invention is to provide a system for measuring the lightning discharge currents in a lightning rod ground conductor wherein there are no insulating parts; the system being entirely metallic in construction.

A further object of the present invention is to provide a measuring equipment of the type mentioned above which is more flexible, less expensive, safer, and more convenient than heretofore known forms of construction.

The foregoing objects and others which may appear from the following detailed description are attained by providing a current shunt in the ground conductor connection, the shunt being so constructed that an inductive voltage drop across the shunt will not appear on the measuring equipment connected to the shunt. This is attained by providing a hollow shunt in which at least one of the conductors connected to the shunt passes coaxially through the center of the shunt. Therefore, the same magnetic field that surrounds the walls of the hollow shunt surrounds the center conductor. The wall as well as the inside center conductor are thus subjected to the same electromotive force and in the same direction. This causes a balancing out action so that, as far as producing currents in the inner conductor is concerned, the effect is equivalent to no electromotive force being produced from the outside field. The pure resistive drop inside the shunt may be conducted through a coaxial cable to the desired type of measuring equipment.

The present invention will be more completely understood by reference to the following detailed description which is accompanied by a drawing in which the lightning pickup rod 10 consists of a hollow tubular pipe directly grounded at the point of mounting to, for example, an antenna tower 12 which is shown in fragmentary cross-section. The pipe then continues inside the tower and to the measuring equipment 13 as an outer shell 22 of a coaxial transmission line. Inside the lower portion 14 of the protruding section of the pickup rod 10, there is a metal plug 16 serving as one shunt terminal to which lead 18 is connected. Lead 18 passes through shell 22 forming the inner conductor of the coaxial transmission line. Transmission line 18, 22 at the lower end terminates in a resistor 20 having a resistance equal to the surge impedance of the coaxial line thus preventing the reflection of energy back up the line. Transmission line 18, 22, is further surrounded by a second outer shell 26 to reduce the resistance of the outer shell 22 and to further shield the measuring circuit from secondary undesired currents. The transmission line, it will be noted, is entirely uncoupled from any electro-magnetic fields set up from a current by a lightning discharge.

The ohmic drop between the location of the inside plug 16 and the connection of the pickup rod 10 to the antenna tower 12 shows up on the inside of the line. It is estimated that if the lightning pickup rod 10 consists of a copper pipe of 1½ inches in diameter with a sixteenth of an inch wall thickness a voltage drop of six-tenths of a volt would be produced across the shunt section 14 if the shunt section has an overall length of ten inches and if the discharge current is of the order of 5,000 amperes. The voltage may be increased if necessary by using thinner wall sections and/or higher resistivity material to increase the resistance of the shunt. Such an increase in resistance may also be desirable to reduce possible error from skin effect in the conductor.

The measuring equipment 13 at the end of the transmission line 18, 22, is preferably entirely enclosed in metal box 24 well bonded to outermost shell 26 of the transmission line. The intermediate shell is grounded to the shielding box through a non-reflecting resistor 28.

In considering the operation of the invention, it should be noted that even though, due to the steep wave front of the current in the lightning conductor, the inductive voltage drop may be many times that of the resistive, this effect occurs only as far as the outside is concerned. Inside the hollow shunt 14 there is no reactive drop. The only voltage drop inside the shunt is that which is due to the resistance of the shunt. The reason for this fact, of course, is that the same magnetic field surrounds both the ground and hollow shunt of the center conductor. As mentioned before, then, the magnetic field has the same effect on the shunt and the center conductor but they are effectively in series opposing relationship with respect to the measuring circuit so that they balance out. The measuring equipment may include a film recording type of cathode ray oscilloscope to give a permanent record of the lightning discharges. The particular details of the measuring equipment have not been shown since they are not included in the present invention. The oscilloscope, as is conventional, may include an amplifier with a linear characteristic to obtain the desired amplitude of deflection for the expected values of current flow through the ground conductor. In some cases it may be desirable to utilize a deflection amplifier so modified that low current discharges cause relatively larger deflections than high discharges, thus reducing the possibility of off-scale deflections for unexpectedly large discharges.

While I have illustrated a particular embodiment of the present invention, it should be clearly understood that it is not limited thereto since many modifications may be made in the several elements employed and in their arrangement without departing from the spirit and scope of the invention. The term "ground" as used hereinbefore should not be construed as being limited to an earthed connection but as including any point of fixed reference or zero potential.

What is claimed is:

1. A lightning rod having a ground conductor in the form of a hollow tube, an inner conductor coaxially arranged within said tube, a conductive plug connecting said inner conductor to said hollow tube at one position therewithin, a connection to another position within said hollow tube spaced a predetermined distance from said one position, and a measuring instrument connected from said inner conductor to said connection, the transmission line formed by said inner conductor and said connection being terminated by a resistor having a resistance equal to the characteristic impedance of said transmission line.

2. A lightning rod having a ground conductor in the form of a hollow tube, an inner conductor coaxially arranged within said tube, a conductive plug connecting said inner conductor to said hollow tube at one position therewithin, a connection to another position within said hollow tube spaced a predetermined distance from said one position, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential.

3. A lightning rod having a ground conductor in the form of a hollow tube, an inner conductor coaxially arranged within said tube, a conductive plug connecting said inner conductor to said hollow tube at one position therewithin, a connection to another position within said hollow tube spaced a predetermined distance from said one position, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential through a non-reflecting resistor.

4. A lightning rod having a ground conductor at least a part of which is in the form of a hollow tube, an inner conductor coaxially arranged within said tube, a conductive plug connecting said inner conductor to said hollow tube at one position therewithin, a connection to another position within said hollow tube spaced a predetermined distance from said one position, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential.

5. An arrangement for measuring high current values in a circuit, including a hollow conductive tube, an inner conductor coaxially arranged within said tube, a conductive plug connecting said inner conductor to said hollow tube at one point therewithin, a connection to another point within said hollow tube spaced a predetermined distance from said one point, and a measuring instrument connected from said inner conductor to said connection, the transmission line formed by said inner conductor and said connection being terminated by a resistor having a resistance substantially equal to the characteristic impedance of said transmission line.

6. An arrangement for measuring high current values in a circuit including a conductor, a portion of which is constituted by a hollow tube, an inner conductor within said tube, a conductive member connecting said inner conductor to said hollow tube at one point therewithin, a connection to another point within said hollow tube spaced a predetermined distance from said one point, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential.

7. An arrangement for measuring current flowing in a conductor in the form of a hollow tube, an inner conductor coaxially arranged within said tube, a conductive member connecting said inner conductor to said hollow tube at one point therewithin, a connection to another point within said hollow tube spaced a predetermined distance from said one point, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential through a non-reflecting resistor.

8. An arrangement for measuring current flowing in a conductor at least a part of which is in the form of a hollow tube, an inner conductor coaxially arranged within said tube, a conductive member connecting said inner conductor to said hollow tube at one point therewithin, a connection to another point within said hollow tube spaced a predetermined distance from said one point, and a measuring instrument connected from said inner conductor to said connection, the transmission line formed by said inner conductor and said connection being terminated by a resistor having a resistance equal to the characteristic impedance of said transmission line, and said measuring instrument being encased within a conductive shell connected to a point of zero reference potential.

9. A structure adapted for measuring current impulses having steep wave fronts flowing through a conductor, including a hollow conductive tube connected in series with said conductor to constitute a resistance element through which the current flowing through said conductor passes, one end of said tube being at a point of fixed reference potential, a measuring instrument, and connections from each end of said resistance element to said measuring instrument, said connections comprising a section of coaxial transmission line having the sheath-conductor thereof connected to the end of said tube at said fixed reference potential and having the center conductor thereof extending within said tube to the other end thereof, said section of coaxial transmission line being terminated by a resistor having a resistance value substantially equal to the characteristic impedance of said section, whereby the reactive effect of the resistance element to said steep wave front current impulses is substantially neutralized.

10. A structure adapted for measuring current impulses having steep wave fronts flowing through a conductor, including a hollow conductive tube connected in series with said conductor to constitute a resistance element through which the current flowing through said conductor passes, one end of said tube being at a point of fixed reference potential, a measuring instrument, and connections from each end of said resistance element to said measuring instrument, said connections comprising a section of coaxial transmission line having the sheath-conductor thereof constituted by extension of said tube at the end thereof at said fixed reference potential and having a center conductor extending within said tube to the other end thereof, said section of coaxial transmission line being terminated by a resistor having a resistance value substantially equal to the characteristic impedance of said section, whereby the reactive effect of the resistance element to said steep wave front current impulses is substantially neutralized.

NILS E. LINDENBLAD.

REFERENCES CITED

The following references are of record in the file of this patent:

UNITED STATES PATENTS

| Number    | Name     | Date          |
|-----------|----------|---------------|
| 2,232,179 | King     | Feb. 18, 1941 |
| 2,273,547 | Radinger | Feb. 17, 1942 |

OTHER REFERENCES

Pamphlet, "Practical Analysis of Ultra High Frequency," R. C. A. Service Co., Inc., August 1943.